(No Model.)

L. B. GIBSON.
MOTOR FOR STREET CARS.

No. 384,146.  Patented June 5, 1888.

Witnesses
Chas. L. Sturtevant.
F. L. Middleton.

Inventor.
Lucius B. Gibson
By his Attorney Ellis Spear.

UNITED STATES PATENT OFFICE.

LUCIUS B. GIBSON, OF PUEBLO, COLORADO.

MOTOR FOR STREET-CARS.

SPECIFICATION forming part of Letters Patent No. 384,146, dated June 5, 1888.

Application filed April 2, 1888. Serial No. 269,392. (No model.)

*To all whom it may concern:*

Be it known that I, LUCIUS B. GIBSON, of Pueblo, in the county of Pueblo and State of Colorado, have invented a new and useful Improvement in Motors for Street-Cars and Like Vehicles; and I do hereby declare that the following is full, clear, and exact description of the same.

My invention is an improvement in apparatus for propelling street-cars and like vehicles, and relates to that class of motors included in other applications of even date herewith, the present invention representing a modified arrangement of the motor and operating parts, and another method of communicating power from the driving-shaft to the axle or wheels of the car than that shown and described in the applications referred to.

This invention consists of a main and supplemental shaft with interposed devices for transmitting the motion of the main to the supplemental shaft operating altogether by friction and comprising a beveled wheel or plate connected to the main shaft in frictional contact with a wheel keyed to the supplemental shaft, the wheels being adapted to change their relative positions to vary the speed of the shaft and the car through the driving-connection with the axle.

The invention also consists in various details of construction and in the arrangement of the parts, as described more particularly hereinafter.

Figure 1:
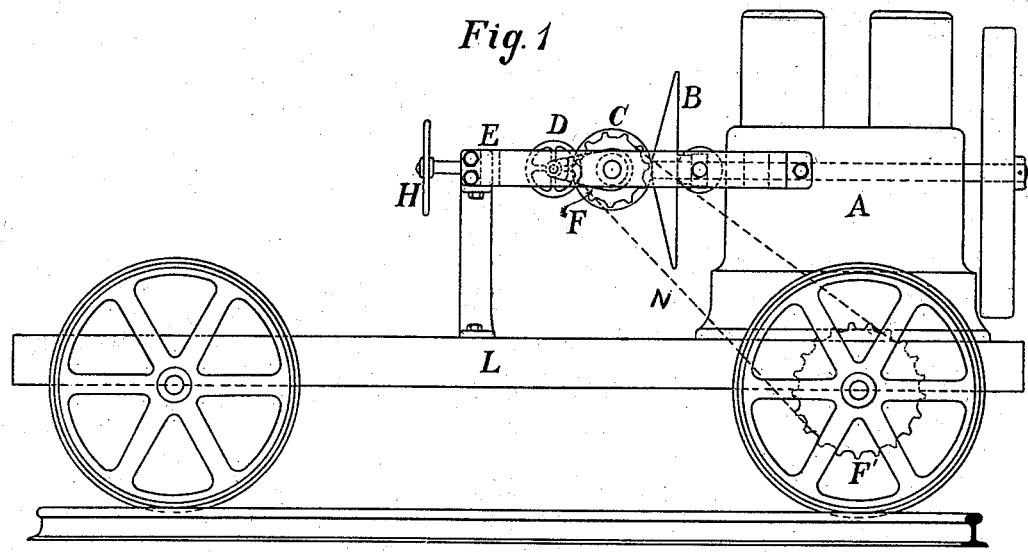
Figure 2:
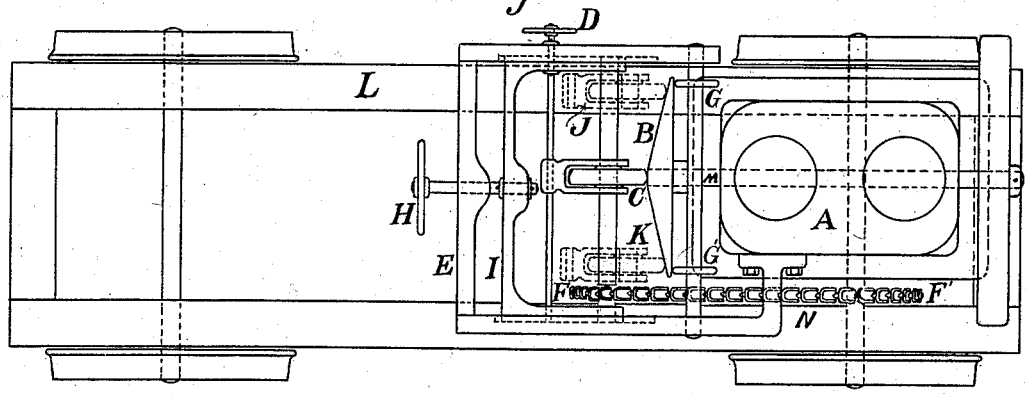

In the drawings, Figure 1 is a side elevation of a car-frame with my improved driving apparatus surmounting it. Fig. 2 is a plan view of the same.

As in the applications referred to, any suitable source of power may be used adapted for the purpose, and I represent this at A. Instead of arranging the engine crosswise of the car, as in the forms of apparatus shown in the before-mentioned applications, in the present form I place it lengthwise of the car-frame with the balance-wheel in the rear. In front of the engine a frame, E, is supported from suitable standards, being connected at the opposite end with the walls of the engine. This frame may, however, be supported in any other suitable manner.

The main shaft is shown at M and is continually revolving. On its projecting and working end is mounted a wheel or disk, B, having a plain rear face and a front face beveled evenly from the center, which is slightly flattened, to the edge or periphery. This disk revolves with the shaft and communicates power to the car, as hereinafter described. A cross-shaft extends from side to side of the frame, as shown at G, immediately in rear of the disk or wheel, and carries two idle-wheels, G' G', which bear against the rear face of the disk and prevent it from "racing" when the connection with the car is not in contact therewith.

A supplemental shaft, K, is mounted in the frame E, through a sliding bracket, I, which slides in the frame in ways on the sides thereof. A screw-rod having a hand-wheel, H, serves to adjust the sliding part I forward or backward, as desired. This supplemental shaft has a wheel or pulley, C, keyed to it by means of a feather extending the whole length of the shaft, by which movement lengthwise of the shaft is permitted, but independent rotary movement prevented. The wheel is held between a yoke, J, which has a tail-piece carried on a screw-threaded rod terminating in a hand-wheel, D, by means of which the wheel C is adjusted upon the shaft, as desired. A sprocket-wheel, F, is secured to the shaft K at one side and through a chain, N, connects with a sprocket-wheel, F', on the axle. The periphery of the wheel or disk C is formed with a slightly-flattened central portion with inclined edges receding from the central portion, and in operation when the disk C is centrally positioned it bears against the center of the friction-wheel B, serving as a brake, but receiving no motion therefrom. When, however, the disk C is shifted to one side, the inclined edge bears against the inclined or beveled surface of the friction-wheel, which transmits movement to the disk through frictional contact by forcing the sliding frame forward to engage the disk with said wheel. This frictional contact revolves the disk and the shaft K, to which the disk is connected, and through the sprocket-chain drives the axle of the car.

By shifting the disk C to one side of the center of the friction-wheel B the car is driven in one direction, and when shifted to the other side of the center the movement of the car is reversed. By moving the disk C to various points on the surface of the friction-wheel the speed of the car may be varied at will.

Having thus described my invention, what I claim is—

1. The described apparatus, consisting of a main driving-shaft, a friction-wheel having its face beveled from the center to the periphery, secured to the end of said shaft at right angles thereto, a supplemental shaft carrying a friction-disk, said shaft being adjustable to make contact between the friction-surfaces, and a driving-connection with the car-axle, substantially as described.

2. The described apparatus, consisting of a main driving-shaft, a friction-wheel secured thereto having its face beveled from the center to the periphery, a supplemental shaft carrying a friction-disk, said disk being adjustable in the shaft to one side or the other of the center, whereby the car is propelled in one direction or the other, means for forcing the disk in contact with the friction-wheel, and driving-connection with the car-axle.

3. The described apparatus, consisting of a driving-shaft, a wheel or disk secured thereto having a beveled front face, a supplemental shaft mounted in an adjustable bracket, a friction-disk feathered on the shaft, means for operating the sliding bracket, means for adjusting the friction-disk, and a driving-connection to the axle, substantially as described.

4. In the described apparatus, the main driving-shaft, the friction-wheel secured thereto having a beveled front face, a shaft in rear of said wheel, carrying idle-pulleys bearing against the rear face of the friction-wheel, an adjustable supplemental shaft, a friction wheel or disk carried thereby adjustable on said shaft, and a driving-connection with the car-axle, substantially as described.

In testimony whereof I have signed my name to this specification in the presence of two subscribing witnesses.

LUCIUS B. GIBSON.

Witnesses:
D. J. SIPES,
E. H. MARTIN.